United States Patent [19]
Gonnella et al.

[11] Patent Number: 5,482,497
[45] Date of Patent: Jan. 9, 1996

[54] METHOD AND APPARATUS FOR TEXTURING ZONES OF A MAGNETIC DISK

[75] Inventors: Norman T. Gonnella; Steven F. Starcke, both of Rochester, Minn.

[73] Assignee: International Business Machines Corporation, Armonk, N.Y.

[21] Appl. No.: 358,856

[22] Filed: Dec. 19, 1994

Related U.S. Application Data

[62] Division of Ser. No. 998,277, Dec. 30, 1992, abandoned.

[51] Int. Cl.$^6$ ...................................................... B24B 1/00
[52] U.S. Cl. .................................. 451/57; 451/37; 451/58
[58] Field of Search ................................ 451/37, 57, 58, 451/63

[56] References Cited

U.S. PATENT DOCUMENTS

| | | | |
|---|---|---|---|
| 3,659,386 | 5/1972 | Goetz et al. | 451/37 |
| 4,835,909 | 6/1989 | Richter | 451/57 |
| 4,939,614 | 7/1990 | Shirakura | 360/135 |
| 5,167,096 | 12/1992 | Eltoukhy | 451/63 |

*Primary Examiner*—Jack W. Lavinder
*Attorney, Agent, or Firm*—Philip M. Kolehmainen; Richard E. Billion; Pryor A. Garnett

[57] ABSTRACT

A magnetic data storage disk includes a surface with a coarsely textured head landing zone and a finely textured data storage area. The coarse texture is applied over the fine texture in the landing zone without forming a step in elevation at the boundary. A method for texturing the magnetic disk includes first applying a fine texture to both the data storage area and the landing zone, and then applying a coarse texture to the landing zone only. Texturing apparatus includes peripheral disk clamps permitting axial compliant movement when the opposed disk surfaces are engaged by balanced, pneumatically biased abrading tools. A free abrasive slurry is introduced to pads carried by the tools.

3 Claims, 3 Drawing Sheets

METHOD AND APPARATUS FOR TEXTURING ZONES OF A MAGNETIC DISK

This application is a divisional application of application Ser. No. 07/998,277, filed Dec. 30, 1992, now abandoned.

FIELD OF THE INVENTION

This invention relates to an improved textured magnetic disk, to a method for making the disk and to apparatus for applying different textures to the read/write head landing zone and the data area of magnetic disks.

DESCRIPTION OF THE PRIOR ART

Magnetic disk units are widely used in computer systems for storage of binary coded data. Such units include magnetic disks with magnetizable surfaces upon which data is written and from which data is read by magnetic read/write heads. High capacity magnetic disks use thin film magnetic media plated or vacuum deposited upon a substrate to achieve high magnetic density. Protective and lubricating layers may be applied over the magnetic active layer.

In one typical arrangement, a magnetic head rests upon an annular head landing zone of the disk surface when the disk unit is not in use. When data is to be written or read, the disk is rotated at high speed and the head, after initially sliding along the landing zone, is lifted away from the disk surface by the effect of air trapped between the disk and the head. When the head reaches its fly height, it is moved radially over a data area where data is written and read without physical contact by the head. Before the rotating disk is stopped, the head is aligned with the landing zone where it lands and comes to rest. U.S. Pat. No. 4,593,329 discloses an assembly in which one track or zone of the disk is used for head landing and other tracks are used for data. IBM Technical Disclosure Bulletin Vol. 23 No. 1 June, 1980 discloses a magnetic recording disk with different coatings in the landing zones and data areas.

The topography of the surface of a magnetic disk has important effects on performance. Texturing or polishing the surface with a generally circumferential pattern improves the magnetic performance and increases the potential data density by improving the squareness and orientation ratio of the magnetic active layer. U.S. Pat. No. 4,698,251 discloses a magnetic disk and a method for making generally circumferential scratches in the disk surface. The scratches result in magnetic anisotropy of the magnetic active layer with the easy axis aligned with the generally circumferential head reading direction.

Providing texture in the landing zone has tribological benefits of reducing stiction, enhancing lubrication and reducing wear. U.S. Pat. No. 4,542,429 discloses apparatus including a textured disk surface and recognizes that increasing the surface roughness reduces the problems that arise from adhesion of the head to the static disk surface.

It has been the usual practice to apply a uniform texture to both the landing zone and the data area. However, this practice necessitates a compromise. To optimize magnetic performance during data writing and reading, a fine texturized or polished surface is best. The fine texture permits a small head fly height and provides the desired magnetic orientation. An excessively rough texture in the data area is not desirable because of distortion of the data bits. Conversely, a rougher texture is needed to provide the best landing zone performance. A fine texture or polish increases the force required to fly the head, while a rough texture reduces stiction when the head is stopped on the disk. A single texture cannot provide optimum results in both disk areas.

In an attempt to overcome the problems resulting from a single texture, it has been proposed that different textures be applied to the landing zone and data area. U.S. Pat. No. 4,973,496 discloses a method for texturing magnetic disks with tapes and free abrasive slurry. This patent applies a texture to the entire polished disk surface, or can use a different roller shape (FIG. 6) to apply the texture to the landing zone only.

U.S. Pat. No. 4,939,614 discloses a magnetic disk that is textured by first grinding the entire surface to provide a relatively rough texture. Then, the data area alone is ground to provide a finer texture or polish. Although the use of different textures can permit surface optimization for both data transfer and head landing, a magnetic disk as disclosed in U.S. Pat. No. 4,939,614 cannot be made without forming an abrupt step in the surface elevation at the boundary between the rough and smooth texture. This step results in a serious problem when the flying head moves across the boundary. If the head strikes the surface, damage to the head and surface can result. To avoid contact the fly height must be larger than the elevation of the step. But even if the flying head clears the step, the head experiences an undesirable shock transmitted from the step by the stiff air bearing. This shock can destabilize the head and cause a head crash or contact of the head with the data area.

Magnetic disks have been textured using a variety of approaches. For example, abrasive disks and tapes with free or bonded abrasive particles are disclosed in U.S. Pat. No. 4,698,251. German patent document 2 204 955 discloses a grinding device for a flat workpiece with two tool holders and a workpiece chuck wherein probes are used to control the amount of surface grinding. Because it is relatively simple to grind an entire disk surface uniformly, known texturing equipment is not able to reliably grind a single zone without leaving a step in the surface in a production manufacturing environment.

SUMMARY OF THE INVENTION

An object of the present invention is to provide an improved method for texturing magnetic disks and to provide improved magnetic disks with textures in different regions optimized for magnetic data transfer in a data storage area and for low static head adhesion in a head landing zone. Other objects of the invention are to provide a magnetic disk with adjoining areas of relatively fine and rough textures without a step in elevation at the boundary, and to provide a method for making such disks. Another object of the invention is to provide improved apparatus for texturing the opposed surfaces of a magnetic disk and to provide apparatus capable of texturing only an accurately defined portion or zone of the disk surface while avoiding the creation of a substantial step in surface elevation at the boundary of the zone with an adjacent data area that is polished or has a fine texture. The term "substantial step" means a step that has an adverse aerodynamic effect on a flying head, causing it the head to impact the step or causing head destabilization.

In brief, the above and other objects and advantages of the invention are achieved by providing a magnetic disk for storage of data by interaction with a read/write head that flies above and lands upon the disk. The disk includes an annular disk surface having an annular data storage area and an annular read/write head landing zone with a boundary between the data storage area and the landing zone. A relatively fine surface texture is in the data storage area; and a relatively coarse surface texture is in the landing zone. The relatively coarse surface texture is substantially coarser than the relatively fine surface texture. The relatively coarse texture is applied over the relatively fine texture and there is no substantial step in surface elevation at the boundary.

In brief, the present invention provides a method for texturing the data area and the head landing zone of the magnetic surface of a magnetic disk including the steps of forming a relatively fine texture pattern upon both the data area and the head landing zone of the disk and, after the forming step, further abrading only the head landing zone of the disk to make a relatively course texture pattern having peaks at substantially the same surface elevation as the relatively fine texture pattern.

In brief, apparatus for texturing a band shaped annular region upon the surface of a magnetic disk in accordance with the present invention includes clamping means for holding the disk in a fixed position while permitting compliant movement of the disk in the axial direction perpendicular to the disk surface. Opposed texturing tools are disposed on opposite sides of the clamped disk and mounted for movement toward and away from the disk. Tool biasing means urges the opposed texturing tools into engagement with opposite surfaces of the disk. Means are provided for producing relative rotation between the tools and the disk and abrasive material is provided between the tools and disk surfaces.

BRIEF DESCRIPTION OF THE DRAWINGS

The invention and the above and other objects and advantages may best be understood from the following detailed description of the embodiment of the invention shown in the accompanying drawings, wherein.

DETAILED DESCRIPTION OF THE INVENTION

Figure 1:
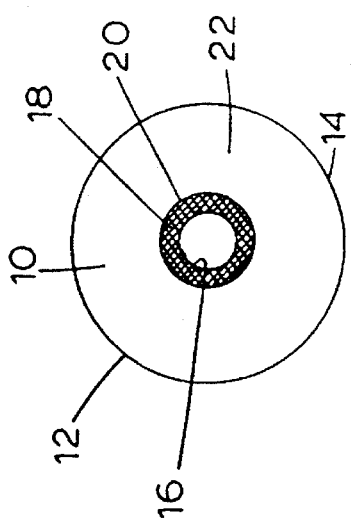
FIG. 1 is a view of one surface of a magnetic disk of the present invention.

Referring now to the drawings, in FIG. 1 there is shown one of the two opposed surfaces 10 of a magnetic disk 12 having an outer circumference 14 and a central axial opening 16. Near its inner diameter, the surface 10 includes an annular read/write head landing zone 18 indicated by cross hatching in the drawing. When the disk 12 is used in a magnetic disk unit, the head contacts the surface 10 in the zone 18 when the disk is started and stopped. A boundary 20 separates the landing zone 18 from a surrounding magnetic data storage area 22. In accordance with the invention, different texture patterns are applied in the zone 18 and area 22, and the boundary 20 does not have a step or configuration that adversely affects the movement or operation of a magnetic read/write head used with the disk 12.

The principles of the invention may be employed with magnetic disks of various types. A typical disk has an aluminum base provided with a layer of a material such as nickel-phosphorus to which the texture patterns are applied. After texturing, an active magnetic layer is applied. For example, an underlayer of chromium and a layer of cobalt alloy such as cobalt-platinum-chromium may be applied by vacuum deposition. A protective layer, for example of carbon, and a layer of lubricant may be applied over the magnetically active layer. Although a single landing zone 18 is usually located near the inner disk diameter, in other arrangements one or more additional landing zones such as the zone 18 may be located at different positions upon the surface 10.

Figure 6:
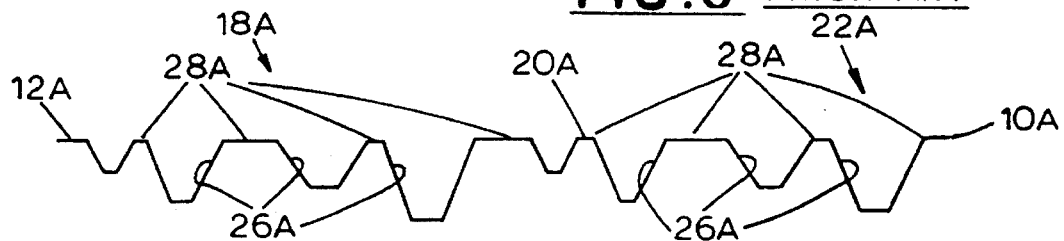
FIG. 6 is a greatly enlarged view showing a part of the surface of a prior art magnetic disk at an intermediate point in a prior art texturing process.
Figure 7:
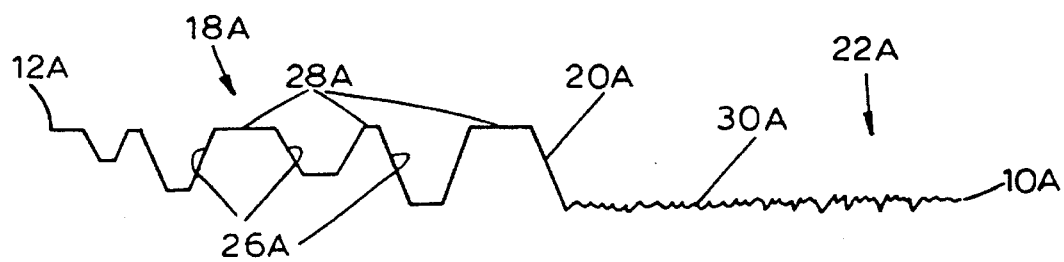
FIG. 7 is a view like FIG. 6 showing the surface of the prior art disk following the prior art texturing process.

A greatly enlarged fragment of the surface 10A of a prior art magnetic disk 12A is shown in FIGS. 6 and 7. As seen in FIG. 7, the disk surface includes a landing zone portion 18A adjacent to a data area 22A. The zone 18A and the area 22A share a boundary 20A. The completed surface texture seen in FIG. 7 results from the prior art texturing method disclosed in U.S. Pat. No. 4,939,614. As disclosed in that patent, first a relatively coarse texture 24A (in the range of from about 50 nm to about 70 nm, col. 3, line 39) is circumferentially ground simultaneously on both the CSS (contact start stop) or landing zone 18A and on the data or recording/reproducing area 22A. The prior art disk 12A at the completion of this first grinding operation is seen in FIG. 6 and includes valleys or grooves 26A and peaks or asperities 28A.

After the first grinding operation, a second grinding operation is performed on the data area 22A only of the prior art disk 12A to apply a relatively fine texture 30A (from about 5 nm to about 10 nm, col. 3, lines 47–48). This second finer grinding operation removes material from the surface 10A because to be effective it must substantially remove the coarse texture 24A from the surface 10A. By removing the asperities 28A formed in the first grinding operation, the second grind lowers the surface elevation relative to the landing zone 18A where the second grind is not performed. The result is a step or abrupt change in surface elevation located at the boundary 20A. This step is undesirable because, if the head fly height is small enough to achieve maximum magnetic coupling with the disk active magnetic layer, the step can obstruct or damage the head as it is moved across the boundary 20A, either by head to disk contact or by shock transmitted to the flying head through the supporting air bearing.

Figure 3:
FIG. 3 is a greatly enlarged view showing a part of the surface profile of the disk of FIG. 1 in cross section and including the boundary of the data area and the landing zone at an intermediate point in the texturing process.
Figure 4:
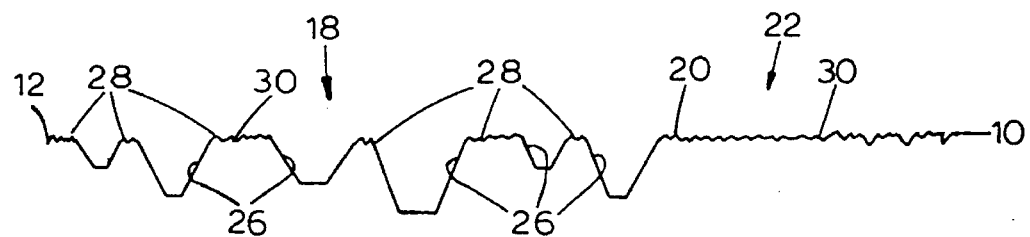
FIG. 4 is a view like FIG. 3 showing the surface following the texturing process.

In accordance with the present invention, the formation of a step is avoided by using a different texturing sequence. In the texturing method of this invention, first the landing zone 18 and the data area 20 are given a fine texture or are polished. The result at this intermediate point in the method is the relatively fine texture 30 seen in FIG. 3. After this initial step, a relatively rough or coarse texture 24 is applied only to the landing zone 18 and not to the data area 22. The result is seen in FIG. 4. During the abrading of the rougher texture in landing zone 18, material is removed to make grooves or valleys 26 in the surface 10, but the remaining peaks or asperities 28 are at substantially the same elevation as the finer texture 30 in the data area 22. In fact, as illustrated in FIG. 4, the summits of the peaks 28 are ungrooved surface portions that can retain parts of the finer texture 30. It is an advantage of this method that there is little or no change in surface elevation at the boundary 22 to cause interference with the flying head.

The duration of time during which the relatively rough texture 24 is applied may affect the result. During the texturing process, as the abrasive cuts the surface, it may raise or plow material up above the surface. At the beginning of the abrading operation, material may be lifted above the original elevation resulting in an undesirable step down from the landing zone 18 to the data area 20. Conversely, if abrading continues too long, an excessive amount of material can be removed resulting in an undesirable step up from the landing zone 18 to the data area 20. In a texturing system used to carry out the method of the present invention, it was found that a texturing operation lasting about 40 to 50 seconds produced the optimum result.

Figure 5:
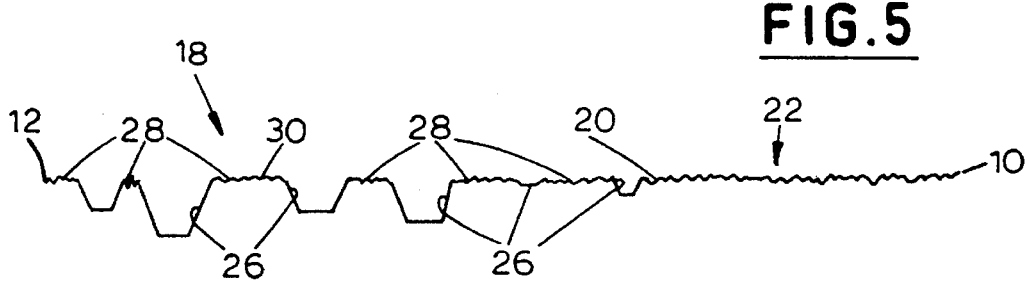
FIG. 5 is a view like FIG. 3 showing the surface following an alternative texturing process.

In FIG. 4 the relatively rough texture 24 is applied to the landing zone 18 with an abrasive medium parallel to the disk surface 10. The result of an alternative method is seen in FIG. 5. Here the rougher texture 24 is applied with an abrasive medium having at least an edge that is angled or feathered relative to the surface 10. Away from the boundary 22, the grooves or valleys 26 are of a depth like FIG. 4. Near the boundary 22, the depth gradually decreases. This reduces even more the possibility that an abrupt step or elevation change will exist at the boundary 22.

A magnetic disk in accordance with the present invention has a landing zone 18 with a relatively rough texture 24 and a data area 22 with a relatively fine texture or polish 30. The rough texture 24 is applied over the finer texture 30, and there is no substantial step or change in surface elevation at the boundary 20 between the landing zone and the data area.

Figure 2:
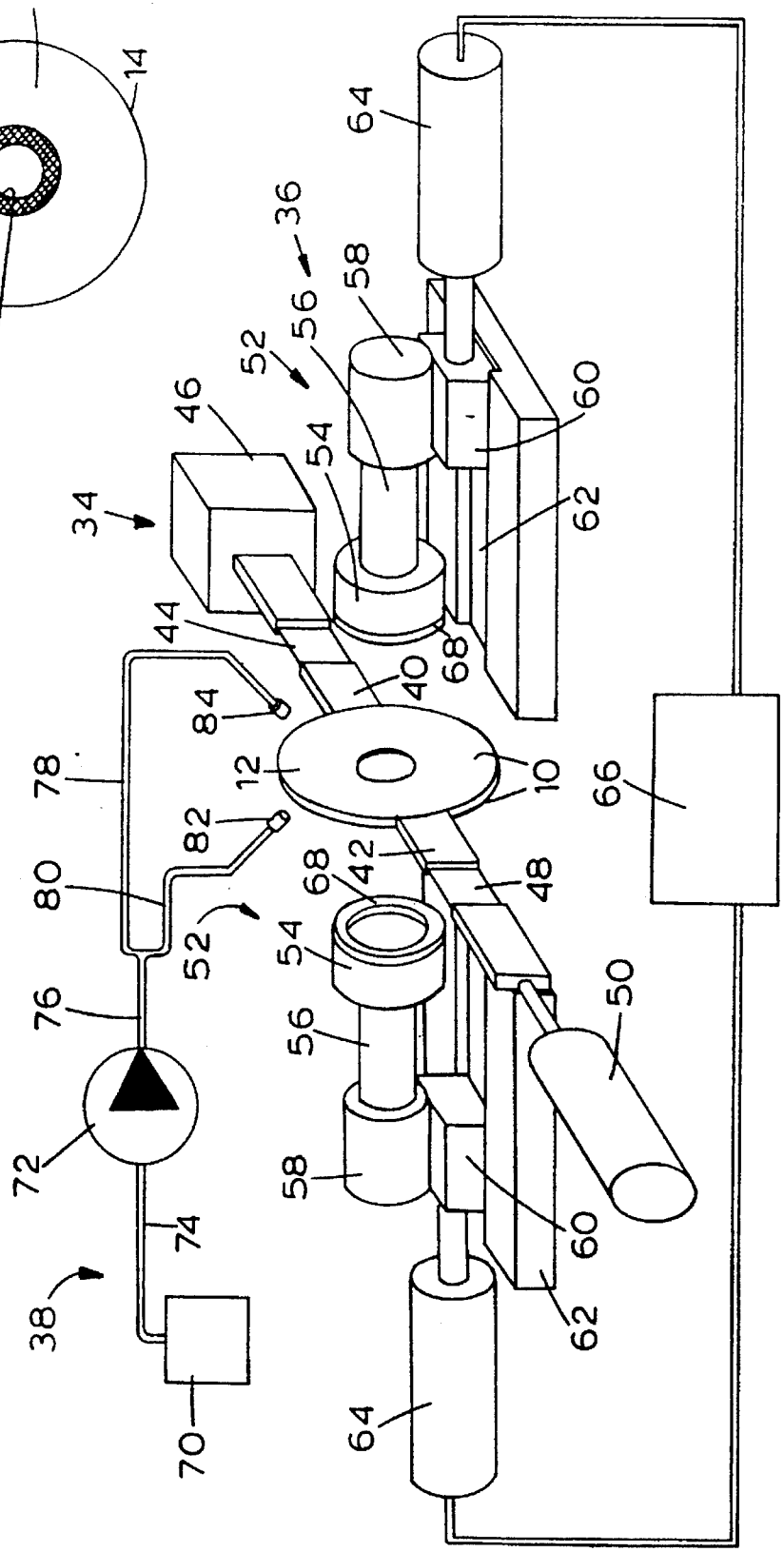
FIG. 2 is a diagrammatic and isometric view of disk texturing apparatus in accordance with the invention.

FIG. 2 shows a texturing apparatus generally designated as 32 and constructed in accordance with the principles of the present invention. In general the apparatus 30 includes a disk clamping assembly 34, a texturing tool system 36 and a free abrasive supply system 38. The apparatus 32 is capable of accurately and repeatably applying texture to a precisely defined annular band or region, such as the landing zone 18, simultaneously on opposite surfaces 10 of a disk 12.

The disk clamping assembly 34 holds the disk 12 firmly against movement in the radial and circumferential directions, yet permits relatively free movement in the axial direction, perpendicular to the surfaces 10. An opposed pair of friction clamp members 40 and 42 engage diametrically opposed regions on the outer circumference 14 of the disk 12. Clamp 40 is connected by a leaf spring 44 to a fixed frame portion 46, while clamp 42 is connected by a leaf spring 48 to a pneumatic cylinder 50. When cylinder 50 is pressurized to extend clamp 42, the clamping assembly is in the position illustrated in FIG. 2 and the disk 12 is held stationary during the texturing operation. The disk 12 is accurately located relative to the tool system 36 so that the texture applied by the texturing apparatus 32 is precisely positioned. The leaf springs 44 and 48 permit compliant movement of the disk 12 during the texturing operation, and frictional engagement of the clamps 40 and 42 with the disk circumference prevent the disk from rotating.

Texturing tool system 36 applies substantially identical bands of texture simultaneously to the two opposite surfaces 10 of the disk 12. System 36 includes a pair of similar texturing tools 52, one located on each side of the clamped disk 10. Each tool 52 includes a head 54 supported on a shaft 56 that is rotated by a motor 58. Each motor 58 is mounted on a reciprocally moveable carriage 60 slideable in a fixed track 62. Carriages 60 are moved between their illustrated retracted positions and their extended positions by a balanced pair of pneumatic cylinders 64 controlled in parallel by a precisely regulated pressurized air supply 66. The tool heads 54 are provided with texturing pads 68 in the shape of bands having inner and outer diameters corresponding to the size of the part of the disk surface 10 to which texture is to be applied.

Free abrasive is supplied to the texturing pads 68 by the supply system 38. A reservoir 70 contains a supply of abrasive-particles in a liquid slurry. A pump 72 feeds the slurry through conduits 74, 76, 78 and 80 to discharge nozzles 82 and 84 located near the regions where the pads 68 engage the opposed surfaces of the disk 12. The slurry including free abrasive particles is deposited or sprayed onto the pads 68 and/or the disk surfaces 10 so that free abrasive particles introduced between the rotating pads 68 and disk surfaces 10 produce bands of texture upon the disk surface.

The force with which texturing is accomplished is accurately and repeatably controlled by using the balanced and regulated air supply 66 to operate the air cylinders 64 in parallel. Because the clamping assembly 34 permits the disk 12 to move in the direction of its axis, the forces applied by pads 68 to opposed sides 10 of the disk 12 are balanced and equal. Thus, similar and precisely located annular bands of texture are applied to the opposed disk surfaces 10. Another advantage of the apparatus 32 is that the abrasive carrying pads 68 engage only the specific region of the disk to be textured and residual contamination is minimized in comparison with systems where abrasive elements pass over the disk edges. When the tools 52 are withdrawn from the disk, a simple overhead spray (not shown) can be used for rinsing the disk.

In carrying out the invention, the texturing pads may be made of an adhesive backed polyurethane foam material and the abrasive slurry can be a water based liquid including a water soluble oil and free abrasive particles such as silicon carbide particles with a particle size of about one micron. Alternatively, instead of a slurry with free abrasives, pads with fixed abrasive particles or abrasive tapes or belts with free or fixed abrasives can be used.

Figure 8:
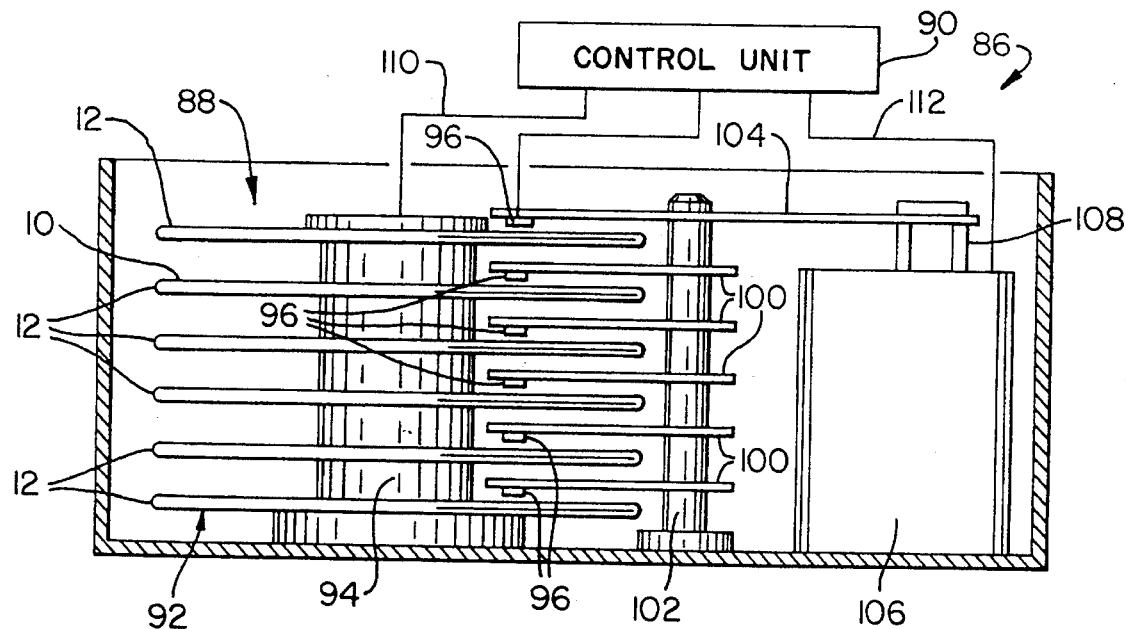
FIG. 8 is a schematic and block diagram of a data storage disk file embodying the present invention.
Figure 9:
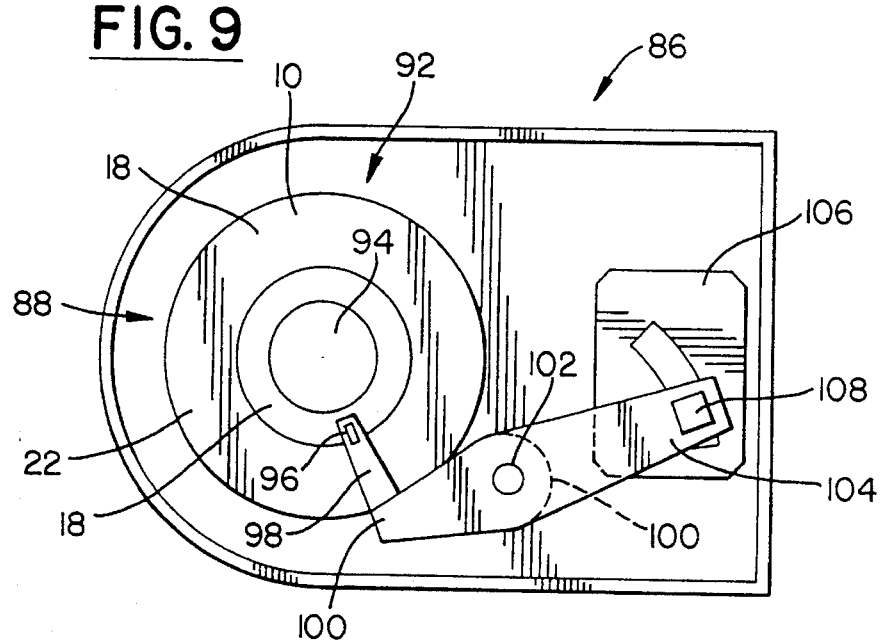
FIG. 9 is a diagram showing the accessing mechanism for a single disk surface of the apparatus of FIG. 8.

Referring now to FIGS. 7 and 8, there is shown a partly schematic block diagram of parts of a data storage disk file 86 including a rigid magnetic disk drive unit generally designated as 88 and an interface control unit generally designated as 90. The file 86 includes a stack 92 of magnetic disks 12, each having a landing zone 18 and a data storage area 22 made by the method and the apparatus described above and incorporating the disk surface structure 10 of the present invention. Although the disks 12 seen in FIGS. 7 and 8 are each shown with a single magnetic data storage surface for simplicity, if desired both opposed surfaces may include landing and data zones 18 and 22.

The disks 18 are mounted in parallel for simultaneous rotation on and by an integrated spindle and motor assembly 94. Data information on each disk 12 are read and/or written to by a corresponding transducer head 96 movable across the disk surface zones 18 and 22. Transducer heads 96 are mounted on flexure springs 98 carried by arms 100 ganged together for simultaneous pivotal movement about a support spindle 102. One of the arms 100 includes an extension 104 driven in a pivotal motion by a head drive motor 106. Although several drive arrangements are commonly used, the motor 106 can include: a voice coil motor (VCM) having a coil 108 cooperating with a magnet and core operatively controlled for moving the transducer heads 96 in synchronism in a radial direction in order to position the heads in registration with selected regions of the data zone 22 or with the landing zone 18. The VCM is movable within a fixed magnetic field, and the direction and velocity of the coil movement is controlled by the current supplied.

The various components of the disk file 86 are controlled in operation by signals generated by control unit 90 such as motor control signals on line 110 and position control signals on line 112. During operation of the disk file 10, the rotation of the disks 12 generates an air bearing between the heads 96 and the disk surfaces 10. This air bearing thus counterbalances the slight spring force of the suspensions 98 and supports the transducer heads 96 above the disk surfaces 10 during normal operation.

While the invention has been described with reference to details of the embodiments of the invention illustrated in the drawings, these details are not intended to limit the scope of the invention as set forth in the appended claims.

We claim:

1. A method for texturing a data area and head landing zone of a magnetic surface of a magnetic disk, said method comprising the steps of:

polishing a relatively fine texture pattern having a surface elevation upon both the data area and the head landing zone of the disk; and after said polishing step, further abrading only the head landing zone of the disk to make a relatively course texture pattern having peaks at substantially the same surface elevation as the relatively fine texture pattern.

2. The method of claim 1 wherein said further abrading step includes applying to the disk surface an abrasive medium parallel to the disk surface.

3. The method of claim 1 wherein said further abrading step includes applying to the disk surface an abrasive medium feathered at an angle relative to the disk surface.

* * * * *